No. 832,034. PATENTED OCT. 2, 1906.
M. R. BRUNER.
VEHICLE AXLE.
APPLICATION FILED FEB. 3, 1906.
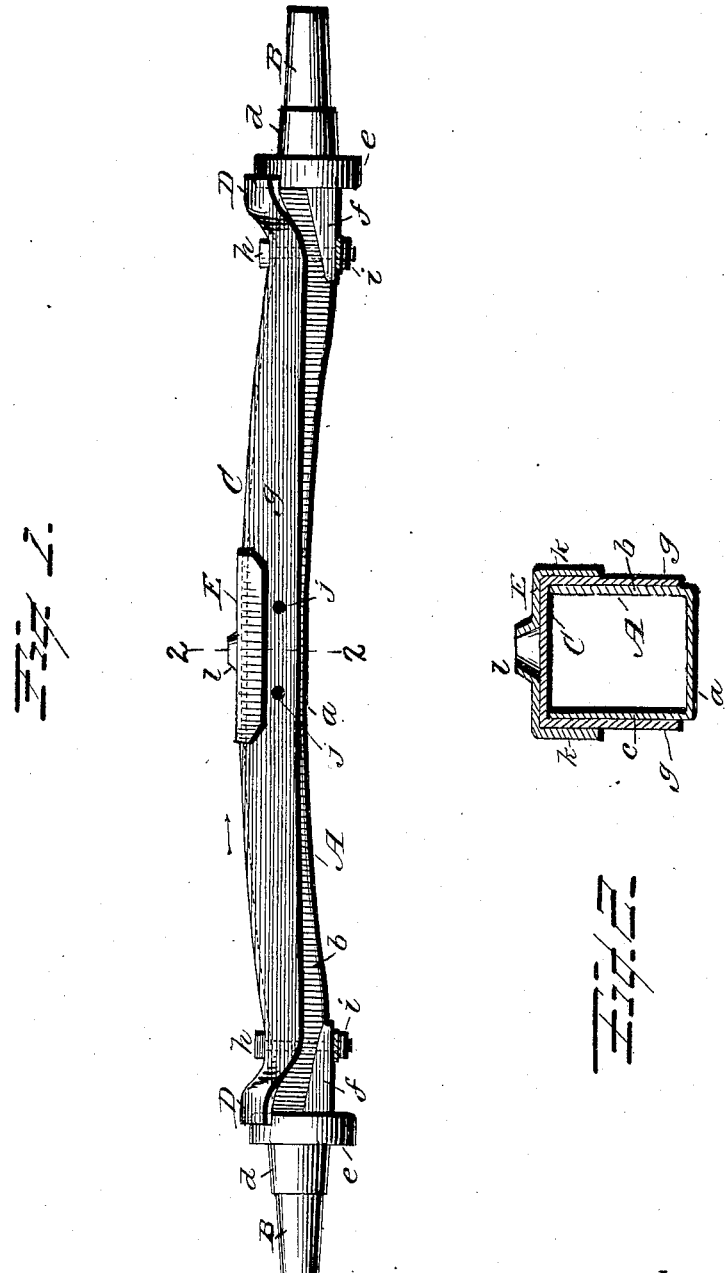
WITNESSES:
INVENTOR
Martin R. Bruner.
By Chas. H. Fowler.
Attorney

UNITED STATES PATENT OFFICE.

MARTIN R. BRUNER, OF WAPAKONETA, OHIO.

VEHICLE-AXLE.

No. 832,034. Specification of Letters Patent. Patented Oct. 2, 1906.

Application filed February 3, 1906. Serial No. 299,348.

*To all whom it may concern:*

Be it known that I, MARTIN R. BRUNER, a citizen of the United States, residing at Wapakoneta, in the county of Auglaize and State of Ohio, have invented certain new and useful Improvements in Vehicle-Axles; and I do hereby declare that the following is a full, clear, and exact description of the same, reference being had to the annexed drawings, making a part of this specification, and to the letters of reference marked thereon.

The present invention has relation to that class of vehicle-axles constructed of sheet-steel bent into shape; and the object thereof is to provide a light, durable, and strong axle in which the greatest strength will be near the center thereof and possessing increased effectiveness in sustaining the load.

The invention consists in a metal axle constructed substantially as shown in the drawings and hereinafter described and claimed.

Figure 1 of the drawings is a side elevation of a metal vehicle-axle constructed in accordance with my invention; Fig. 2, a cross-section, on an enlarged scale, taken on line 2 2 of Fig. 1.

In the accompanying drawings, A represents the axle, constructed of sheet-steel and bent to form the bottom $a$ and sides $b$ $c$ and having at its ends the spindles B, which are integral therewith and formed by bending the metal into shape. Upon the spindles B are the inner halves of skeins, as indicated at $d$, and $e$ is the dust-cup, said skeins having the flanged extensions $f$, which engage the under side of the axle and serve to reinforce the axle at the ends thereof to increase its strength.

The axle-cap C, which extends over the open part or top of the axle, has downwardly-extending flanges $g$, which lap the sides of the axle, and these flanges increase in width in a direction toward the center thereof to give the greatest strength where most required. The increased width of the side flanges $g$ against the sides of the axle form together a double thickness, which provides great strength at or near the center of the axle, and as the flanges decrease in width in the direction of the ends thereof great lightness is secured. The ends of the cap C terminate in hoods D, which extend over the dust-cups $e$, and said ends are held to the axle by bolts $h$, which extend therethrough and through the axle, and the flanged extension $f$, with a nut $i$, engages the screw-threaded end of the bolt. The axle-cap C is secured to the axle at or near its center by means of suitable bolts or rivets extending through holes $j$ in the sides of the axle and the flanges of the cap, so as to prevent the flanges from springing out from the axle, and forming a secure connection between said axle and cap.

The sand-plate E has downwardly-extending flanges $k$, which embrace the sides of the axle-cap C and are secured thereto in any suitable manner. The sand-plate E is formed with a cup-shaped opening $l$ for the king-bolt, said king-bolt passing down through holes in the axle-cap and axle. In having the interior wall of the opening $l$ flaring outwardly the king-bolt when extending through the opening will not come in contact with said wall, thereby reducing the friction thereon.

Having now fully described my invention, what I claim as new, and desire to secure by Letters Patent, is—

1. A vehicle-axle constructed of sheet-steel and a cap extending over said axle and embracing the sides thereof, said cap having downwardly-extending flanges increasing in width in a direction toward the center of the axle, the cap terminating in hoods, substantially as and for the purpose described.

2. A vehicle-axle constructed of sheet-steel, a cap therefor having downwardly-extending flanges embracing the sides thereof and increasing in width in a direction toward the center of the axle, said cap terminating at its ends in hoods, and a sand-plate having a cup-shaped opening and secured over the axle-cap, substantially as and for the purpose specified.

In testimony whereof I affix my signature in presence of two witnesses.

MARTIN R. BRUNER.

Witnesses:
T. H. HUBBARD,
JOHN L. FLETCHER.